United States Patent
Lee et al.

(10) Patent No.: US 6,844,103 B2
(45) Date of Patent: Jan. 18, 2005

(54) APPARATUS AND METHOD OF RECOVERING LITHIUM COBALT OXIDE FROM SPENT LITHIUM BATTERIES

(75) Inventors: Churl Kyoung Lee, Daejeon (KR); Kyu Seung Han, Busan (KR); Do Su Kim, Daejeon (KR); Jung Soo Shon, Daejeon (KR)

(73) Assignee: Korea Institute of Geosciences and Mineral Resources, Daejeon (KR)

( * ) Notice: Subject to any disclaimer, the term of this patent is extended or adjusted under 35 U.S.C. 154(b) by 167 days.

(21) Appl. No.: 10/284,329

(22) Filed: Oct. 31, 2002

(65) Prior Publication Data

US 2003/0222020 A1 Dec. 4, 2003

(30) Foreign Application Priority Data

Jun. 3, 2002 (KR) .................. 10-2002-0031168

(51) Int. Cl.$^7$ .............................. H01M 10/42
(52) U.S. Cl. .................. 429/49; 422/225; 422/236; 423/179.5
(58) Field of Search .................. 422/129, 225, 422/236–239; 423/179.5; 366/242–251; 429/49

(56) References Cited

U.S. PATENT DOCUMENTS

| | | | | |
|---|---|---|---|---|
| 4,957,708 A | * | 9/1990 | Dutton et al. | 422/106 |
| 5,478,664 A | * | 12/1995 | Kaneko et al. | 429/49 |
| 5,882,811 A | * | 3/1999 | Kawakami | 429/49 |
| 6,150,050 A | * | 11/2000 | Mathew et al. | 429/49 |
| 6,338,828 B1 | * | 1/2002 | Stupin et al. | 422/224 |
| 6,524,737 B1 | * | 2/2003 | Tanii et al. | 429/49 |

* cited by examiner

Primary Examiner—Joseph Drodge
(74) Attorney, Agent, or Firm—GWIPS

(57) ABSTRACT

An apparatus and method is provided for recovering lithium cobalt oxide from spent lithium batteries. The method of recovering lithium cobalt oxide comprises the steps of: separating the cathodes from spent lithium batteries by dismantling; producing lithium cobalt oxide by reacting the cathodes with a strong alkali solution under a certain hydrothermal condition; cooling the lithium cobalt oxide to crystallize; and cleansing the synthesized lithium cobalt oxide to remove foreign objects. The apparatus for recovering lithium cobalt oxide comprises a reactor main body 300 having a sealing cap 320 on the upper section and an agitator 130; an outer reaction container 200 installed inside the reactor main body 300; and an inner reaction container 100 installed inside the outer reaction container 200. The inner reaction container 100 comprises a plurality of holes on the upper section and a separating cap 240. A reaction container holder 230 mutually supports the outer reaction container 200 and the inner reaction container 100.

9 Claims, 3 Drawing Sheets

APPARATUS AND METHOD OF RECOVERING LITHIUM COBALT OXIDE FROM SPENT LITHIUM BATTERIES

BACKGROUND OF THE INVENTION

1. Field of the Invention

The present invention relates to an apparatus and method of recovering lithium cobalt oxide from lithium batteries that have already been depleted of their energy. More particularly, the recovering technology concerns the recycling of lithium cobalt oxide from spent lithium batteries. At the end of the life of the batteries, the batteries are dismantled to separate the electrode materials from the waste and to recover selectively only the cathode active materials under a hydrothermal condition.

2. Description of the Prior Art

Generally, a lithium battery having properties of highly dense energy and a low weight is the major power source for most small portable electrical equipment. Recently, usage of lithium ion secondary batteries has rapidly increased.

A lithium ion secondary battery comprises an anode, a cathode, an organic electrolyte and an organic separator. Lithium cobalt oxide has properties of excellent reversibility, low discharging rate, high capacity, high energy density, and easy synthesis. Lithium cobalt oxide is presently commercialized as the active material in lithium ion secondary batteries.

A lithium ion secondary battery comprises a cathode, which is an electric collecting aluminum plate coated with a mixture of carbon group and organic compounds, using lithium cobalt oxide as the active material; an anode, which is an electric collecting copper plate coated with a mixture of carbon group of graphite and organic compounds, as a cathode active material; an organic electrolyte, dissolved in an organic separator and lithium salt in an organic solvent formed as a unit cell; and a combination of more than one unit cell packaged in plastic with a charging protection IC chip.

A lithium ion secondary battery comprised of such compositions as mentioned above has the capability of charging and discharging with a relatively longer life span. However, it has a limited life span of about 500 cycles. Therefore, the number of disposed batteries increases as the consumption of batteries increases. However, the spent lithium ion batteries contain relatively valuable organic metals, such as lithium and cobalt, with a simple crystal structure. Thus, the waste is still considered economically valuable.

From the recycler's viewpoint, spent lithium batteries have the above-mentioned advantages. However, the organic electrolyte, organic separator, and plastic materials used for the external battery are hard to dispose of due to the toxic substances they contain which contaminate the environment. Therefore, those materials must be recycled to recover valuable resources and also to protect the environment.

However, the technology for recycling spent lithium batteries is in the initial stage of development in Korea. In Japan, the technologies for recycling lithium primary batteries, lithium ion secondary batteries, and scraps produced during the manufacturing process are in the practical stages.

Also, the technology for recycling spent lithium ion secondary batteries still needs improvement. Specifically, the technology needs a means of excluding foreign materials, a moderate process for preventing excessive crashing, and a technique for concentrating valuable metals by selectively separating anodizing materials.

SUMMARY OF THE INVENTION

The object of the present invention is to provide an apparatus and method of recovering lithium cobalt oxide from spent lithium batteries by effectively recycling the batteries by stably dismantling them and by selectively re-synthesizing the lithium cobalt oxide of anodizing active materials in a valuable powder state.

Another object of the present invention is to provide an apparatus and method for effectively recovering recyclable lithium cobalt oxides that constitute useable electrode materials from spent lithium batteries by using a hydrothermal treatment with catalytic reactions of the alkali solution. During the recovery of cathode active materials, foreign materials are prevented from admixing so that reusable lithium cobalt oxide is obtained.

DETAILED DESCRIPTION OF THE PREFERRED EMBODIMENT

To achieve the above-mentioned objectives, the present invention provides a method of recovering lithium cobalt oxide from spent lithium batteries. The method comprises the following steps of: separating the cathodes from spent lithium batteries by dismantling the spent lithium batteries; obtaining or producing lithium cobalt oxide by reacting the cathodes with a strong alkali solution under a certain hydrothermal condition; cooling or condensing the lithium cobalt oxide to crystallize; and cleansing the synthesized lithium cobalt oxide to remove foreign objects.

The apparatus for recovering the lithium cobalt oxide comprises a reactor main body having a sealing cap on its upper section and an agitator supported by a platform; an outer reaction container 200 installed inside of the reactor main body; and an inner reaction container 100 with a smaller diameter than that of the outer reaction container 200 that fits inside of the outer reaction container 200. The inner reaction container 100 comprises a plurality of holes on the upper section, a separating cap, and an agitator.

Hereinafter, the preferred embodiments of the present invention will be described in detail, with accompanying drawings.

Figure 1:
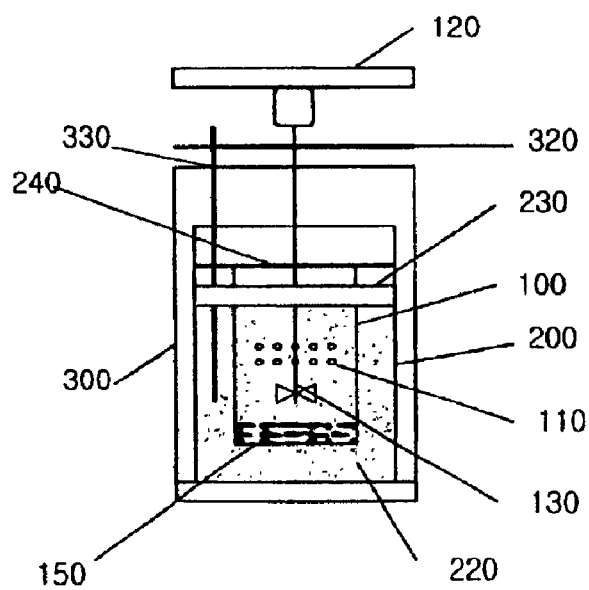
FIG. 1 shows a hydrothermal synthesis reacting apparatus for recovering lithium cobalt oxide according to the present invention.

As shown in FIG. 1, the reactor main body 300 comprises a sealing cap 320 on its upper section. Inside of the reactor main body 300, an agitator 130 supported by a platform 120 is installed for stirring the solution during the reaction.

Also, an outer reaction container 200 is installed inside of the reactor main body 300. The inner reaction container 100 has a smaller diameter than that of the outer reaction container 200 and is inserted inside the outer reaction container 200. A plurality of holes having diameters of 0.1 mm to 1.0 mm is arranged in three rows on the upper part of the inner reaction container 100. The inner reaction container 100 is supported by a sealing cap 240 disposed on top of the outer reaction container 200 for sealing each reaction container to prevent admixing each reactant in each container.

The agitator 130 is inserted into the inner reaction container 100, and a thermometer 330 is inserted into the outer reaction container 200. The outer reaction container 200 and the inner reaction container 100 are mutually supported by a reaction container holder 230 at a proper operating position.

Hereinafter, the operation of the reacting apparatus having the configuration as above-mentioned will be described in detail.

According to the present invention, the cathode pastes 150 separated from the spent lithium batteries are first placed in the inner reaction container 100. Next, 300 ml of strong alkali solution 220, selected from either lithium hydroxide, sodium hydroxide, or calcium hydroxide from the hydroxide group having a concentration rate of two to seven moles, is gradually transferred into the outer reaction container 200, which is made of Teflon.

The plurality of holes 10 is perforated on the upper wall of the inner reaction container 100. Those holes are for passing the cathode pastes and lithium hydroxide solution during the hydrothermal reaction. The holes 110 are uniformly arranged in three rows, with regular intervals between them.

After transferring the lithium hydroxide solution into the outer reaction container 200, the inner reaction container 100 is gradually lowered through the reaction container holder 230. At this point, caution is needed not to spill or overflow the strong alkali solution. At the right operating position, the outer reaction container 200 and inner reaction container 100 are fixed on the reaction container holder 230.

The separation cap 240 mounted on the upper part of the inner reaction container 100 prevents the selected lithium-aluminum hydrate or lithium hydroxide aggregate from admixing with the cathode pastes.

According to the present invention, the lithium batteries are dismantled by an impulsive crasher, which separates the cathodes.

Sequentially, lithium cobalt oxide is generated on both sides under the hydrothermal event influenced by a strong alkali reaction. The hydrothermal event is controlled above 100° C. to improve the purity and crystallization of lithium cobalt oxide under a strong alkali reaction. Lithium hydroxide is selected as the strong alkali in order to reduce the possibility of contamination from other cathode ions.

Also, cooling is carried out to control the crystallization of lithium cobalt oxide and the dissolution of impurities. At this point, a cleansing process is undertaken to remove impurities from the recovered lithium cobalt oxide.

It is preferable to use ultrasonic waves for the cleansing process to improve the dispersion of powder. A diluted acid solution having a concentration rate lower than 10% and a temperature of 25° C. to 100° C. is used for removing the absorbed impurities from the synthesized lithium cobalt oxide.

If the acid solution having a concentration rate higher than 10% is used, the lithium and cobalt recovered from the above process are dissolved along with the impurities. Usage of the excessively concentrated acid causes a decrease in the efficiency of removal of impurities and an increase in the cost of processing.

Continuously, due to the hydrothermal event, the lithium and cobalt are not separately recovered. The lithium cobalt oxide powder as an anodizing material is directly synthesized for use with the lithium battery.

Hereinafter, the recovery method of lithium cobalt oxide, including the above steps, will be described in detail along with the implementing examples of the present invention.

Firstly, the cathode paste separated from the spent or waste lithium battery is placed in the inner reaction container 100, and a strong alkali aqueous solution of 300 ml having a concentrating rate of 0.5 mole is gradually transferred into the outer reaction container 200. The inner 100 and outer 200 reaction containers are made of Teflon.

A plurality of holes having diameters of 0.8 mm is formed on the upper wall of the inner reaction container 100, where holes act as passages for the cathode paste and the lithium hydroxide solution.

After transferring the lithium hydroxide solution into the outer reaction container 200, the inner reaction container 100 is slowly lowered through the reaction container holder to fix them in such a way that no overflowing of strong alkali solution occurs.

In this instance, the separation cap 240 mounted on the upper part of the inner reaction container, 100 prevents the admixing of lithium-aluminum hydrate ($LiAlO_2 \cdot nH_2O$), which is expected to erupt from the cathode pastes or lithium hydroxide aggregate condensed on the wall during cooling of the container.

The hydrothermal treatment for recovering lithium cobalt oxide from the cathode paste is performed at 200° C. for each reacting hour. The hydrothermal reacting temperature is raised to a corresponding temperature from the normal temperature in increments of 5° C. per minute. The hydrothermal treatment hour is taken as the hour maintained at the corresponding temperature.

The pressure increment during the hydrothermal treatment relies solely on generated steam pressure at the reacting temperature without supplying outside pressure. In order for the lithium hydroxide solution to react smoothly and uniformly with the cathode paste during the hydrothermal treatment, a Teflon agitator continuously agitates the solution at a consistent speed of 50 rpm during the process.

After completing the reaction, a slow cooling process is adopted at a rate of 1 to 5° C. per minute in order to recover an excellent crystallization of lithium cobalt oxide.

According to the present invention, reacting time varies from two hours to twenty hours under a constant reacting temperature of 200° C. Table 1 presents the implementing examples 1 through 4 as follows:

| Classified | Concentration of lithium hydroxide solution (mole) | Quantity of used (g) cathode paste | Reaction temperature (° C.) | Reaction time (hours) |
|---|---|---|---|---|
| Implementing Example 1 | 5.0 | 5.0 | 200 | 2 |

-continued

| Classified | Concentration of lithium hydroxide solution (mole) | Quantity of used (g) cathode paste | Reaction temperature (° C.) | Reaction time (hours) |
|---|---|---|---|---|
| Implementing Example 2 | 5.0 | 5.0 | 200 | 3 |
| Implementing Example 3 | 5.0 | 5.0 | 200 | 5 |
| Implementing Example 4 | 5.0 | 5.0 | 200 | 10 |

A 99.8% concentration of lithium cobalt oxide is selected as the standard comparison for each implementing example. A sample of lithium cobalt oxide recovered from each implementing example is compared with the standard.

According to the method proposed in the present invention, lithium cobalt oxide is precipitated on the bottom of the Teflon inner reaction container 100 at the completion of the reaction in accordance with the Reaction Formula, as listed below.

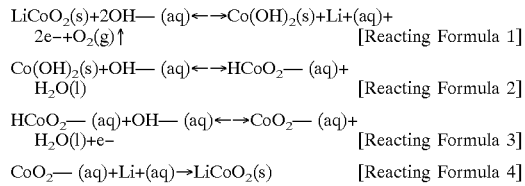

$LiCoO_2(s)+2OH^-(aq) \leftrightarrow Co(OH)_2(s)+Li^+(aq)+2e^-+O_2(g)\uparrow$ [Reacting Formula 1]

$Co(OH)_2(s)+OH^-(aq) \leftrightarrow HCoO_2^-(aq)+H_2O(l)$ [Reacting Formula 2]

$HCoO_2^-(aq)+OH^-(aq) \leftrightarrow CoO_2^-(aq)+H_2O(l)+e^-$ [Reacting Formula 3]

$CoO_2^-(aq)+Li^+(aq) \rightarrow LiCoO_2(s)$ [Reacting Formula 4]

In order to recover a purified lithium cobalt oxide from the above process, the residual lithium hydroxide on the surface and contained within the lithium cobalt oxide must be rinsed out several times with distilled water. Finally, a process is needed to remove the residual lithium hydroxide compound and other impurities from the lithium cobalt oxide by using 20 kHz frequencies of ultrasonic waves.

After the cleansing process is completed, the slurry state of lithium cobalt oxide is dried for a day at 50° C. for use as a test sample of property analysis.

Figure 2:
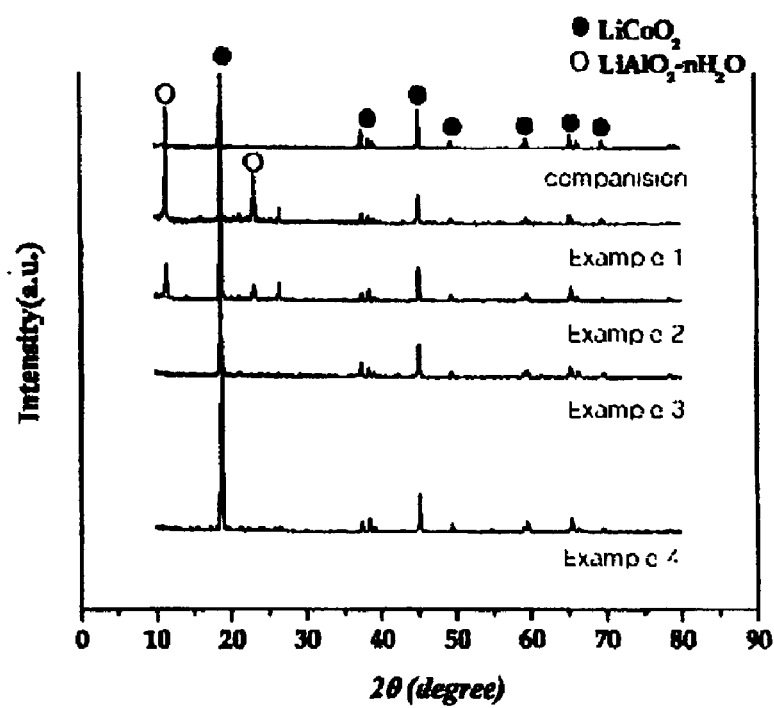
FIG. 2 shows the result, illustrating an X-ray refraction analysis of lithium cobalt oxide powder according to the present invention.

The property of crystallization for the recovered lithium cobalt oxide is verified at the refraction angle $2\theta=10°\sim80°$ as shown in FIG. 2, through a powder X-ray refraction analyzer. Also, the verification of crystallization of recovered lithium cobalt oxide is observed through a scanning electron microscope with a magnification of 1,000 times.

The result of the powder X-ray refraction analysis at 200° C. reveals that a peak production of lithium-aluminum hydrate ($LiAlO_2 \cdot nH_2O$) reacts with the lithium ions at a reacting time of two hours, and then three hours later the residual aluminum in the inner reaction container 100 becomes dissociated as soluble ions without being dissolved from the cathode paste beside the lithium cobalt oxide.

Beyond the five hours of reaction time, only the crystal peak of lithium cobalt oxide is observed. This is a result of hydrated aluminum from the discharges of generated aluminated ions ($AlO_2^-$) through holes formed on the upper part of the inner reaction chamber 100, as represented in Reacting Formula 5.

At this moment, the aluminated ions discharged from the inner reaction chamber 100 react with the lithium ions dissociated from the solution, as presented in Reacting Formula 6. Lithium-aluminum hydrate is precipitated at the bottom of the outer reaction chamber 200, as a reproduction, and separated from the lithium cobalt oxide produced in the inner reaction chamber 100.

Since the production process of lithium-aluminum hydrate is irreversible, lithium-aluminum hydrate produced during the hydrothermal treatment could flow back to the inner reaction chamber 100. However, this phenomenon is never verified beyond five hours.

$Al(s)+3OH^-(aq) \leftrightarrow AlO_2^-(aq)+H_2O(l)+H^+(aq)$ [Reacting Formula 5]

$AlO_2^-(aq)+Li^+(aq)+n\ H_2O(l) \leftrightarrow LiAlO_2+n\ H_2O(s)$ [Reacting Formula 6]

This is an effect of the separator cap being mounted on the upper part of the inner reaction chamber 100 to prevent admixing of the lithium-aluminum hydrate that erupted from the cathode pastes during the reacting of lithium hydroxide crystallization formed on the wall during the cooling process.

Figure 3:
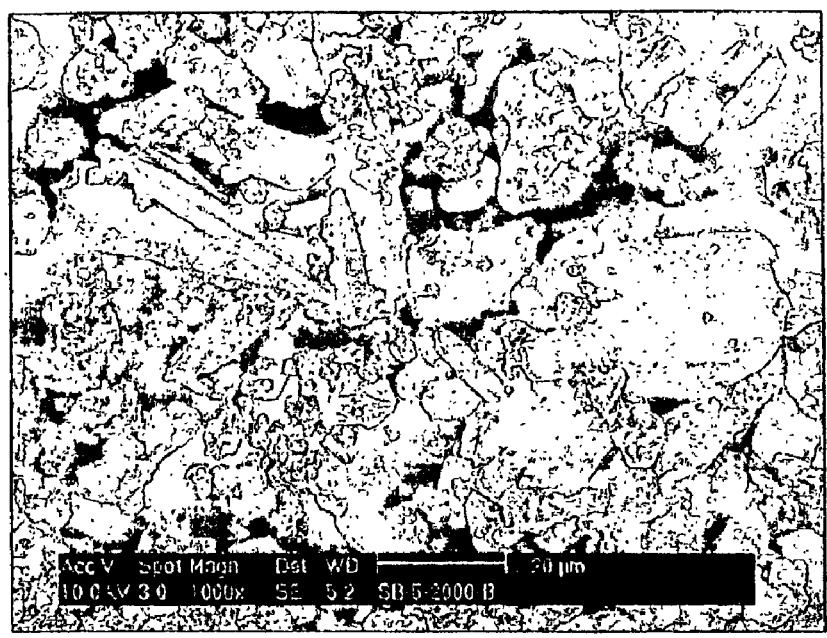
FIG. 3 shows a scanning electron photomicrograph of lithium cobalt oxide treated hydrothermally for five hours at 200° C. according to the present invention.

According to implementing example 3 of the present invention, performed at 200° C. for five hours of reacting time, a result of powder X-ray refraction analysis through the scanning electron microphotograph reveals that the recovered lithium cobalt oxide has a crystal shape of a hexagonal plate, as shown in FIG. 3. The sizes of the lithium cobalt oxide particles are distributed from 5 μm to 20 μm.

Figure 4:
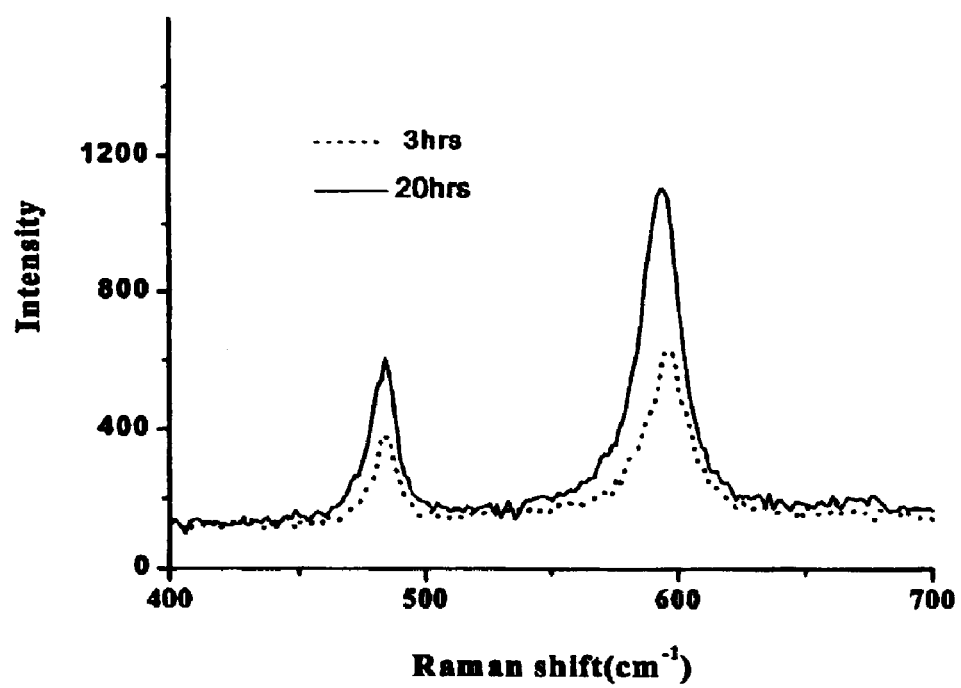
FIG. 4 shows the result of Raman analysis of hydrothermally treated lithium cobalt oxide according to the present invention.
Figure 5:
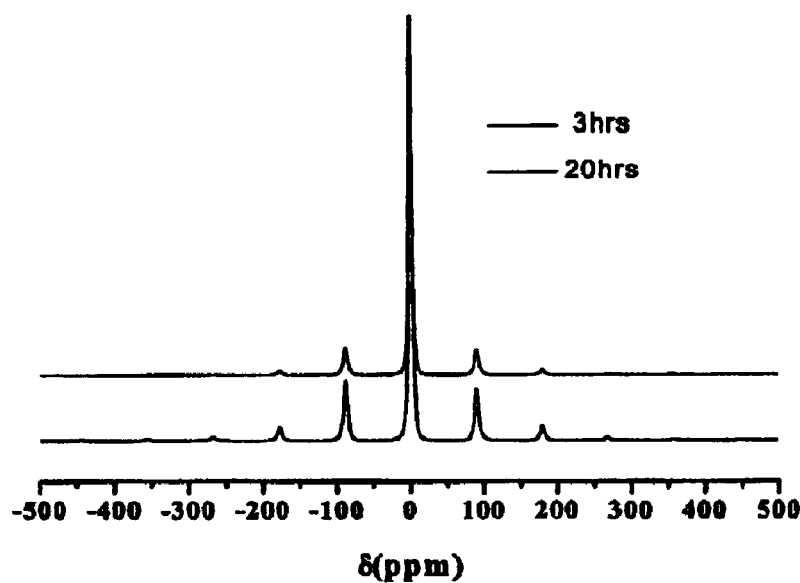
FIG. 5 shows the result of Li-NMR analysis of hydrothermally treated lithium cobalt oxide according to the present invention.

According to other implementing examples performed at a temperature of 200° C. for three hours and for twenty hours reacting time, a result of Raman and Li-NMR analysis, as shown in FIG. 4 and FIG. 5, reveals that the recovered lithium cobalt oxide powder has high purity and excellent crystallization. It is verified that lithium cobalt oxide is able to synthesize from spent lithium batteries without any additional separating treatment in the hydrothermal reacting container of the present invention.

Figure 6:
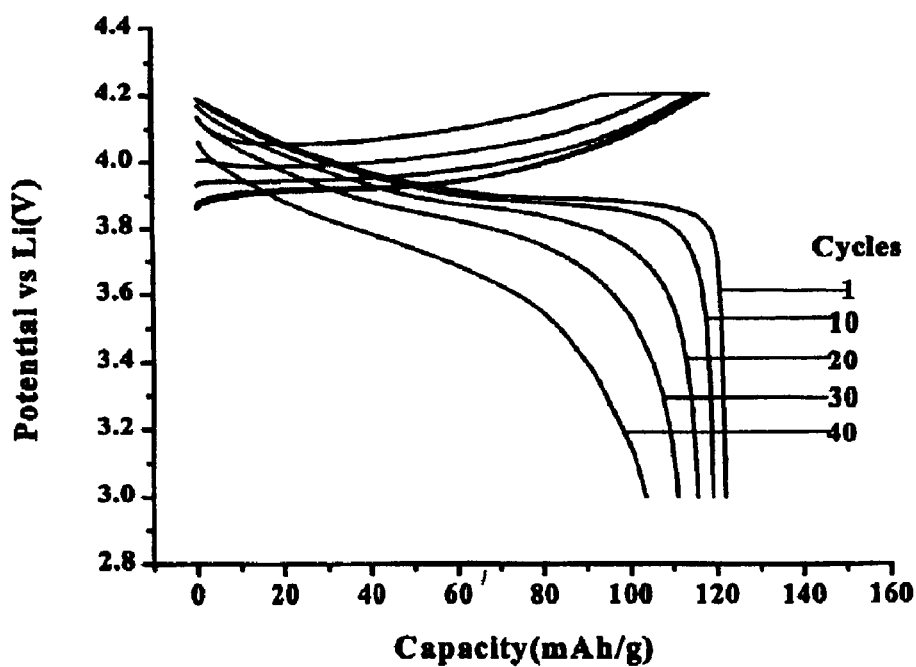
FIG. 6 shows the result of a charging and discharging analysis of hydrothermally treated lithium cobalt oxide according to the present invention.

Further, a charging and discharging experiment is performed to verify whether the recovered lithium cobalt oxide of the present invention is reusable as the active materials for lithium batteries, which use that material manufactured through the normal production process. The result of the charging and discharging experiment is presented as shown in FIG. 6.

The result reveals that the capacity of charging and discharging of recovered lithium cobalt oxide is about 90% that of the conventional cathode. It also shows that the capacity of charging and discharging decreases as the number of cycles increases. Since a concentrated lithium hydroxide solution is used for the hydrothermal treatment, a residual lithium hydroxide remains in the powder. Thus, it is possible to remove residual lithium hydroxide by cleansing with a low acid solution and by ultrasonics.

According to the present invention, lithium cobalt oxide powder as the active material can directly synthesize from spent lithium batteries instead of recovering lithium and cobalt separately from spent lithium batteries. The recovered lithium cobalt oxide by the hydrothermal treatment of the present invention has the properties of high purity and excellent crystallization.

There is an advantage to applying the recovering process of lithium cobalt oxide directly without separate processes for recycling the active material slurry, cathode scrap, and default batteries all of which are generated during the production process.

This invention has been described with reference to implementing examples. Obviously, modifications and alterations will be made by others upon reading and understanding the preceding detailed description. It is intended that the invention be construed as including all such modifications and alterations insofar as they come within the scope of the appended claims or the equivalents thereof.

What is claimed is:

1. A method of recovering lithium cobalt oxide from spent lithium batteries, the method comprises steps of:

separating cathodes from spent lithium batteries by dismantling said spent lithium batteries, producing lithium cobalt oxide by reacting the cathodes with a strong alkali solution in a hydrothermal event, cooling said lithium cobalt oxide to crystallize, and cleansing crystallized lithium cobalt oxide to remove impurities.

2. The method as claimed in claim 1, wherein the separating step for separating cathodes from dismantling spent lithium batteries performs by utilizing an impulsive crasher to solely collect cathode materials.

3. The method as claimed in claim 1, wherein the producing step for obtaining the lithium cobalt oxide performs by reacting the cathodes with a strong alkali solution under hydrothermal treatment in temperature above 100° C.

4. The method as claimed in claim 3, wherein the strong alkali solution is selected from the group consisting of lithium hydroxide, sodium hydroxide or calcium hydroxide to dissolve in 2~7 moles of concentrated aqueous solution.

5. The method as claimed in claim 1, wherein the cooling step for cooling lithium cobalt oxide to crystallize adopts a slow cooling rate of 1° C.~5° C. per minute.

6. The method as claimed in claim 1, wherein the cleansing step for cleansing said crystallized lithium cobalt performs to wash out impurities by utilizing a diluted acid solution with a concentration below 10% at a temperature of 25° C.~100° C.

7. The method as claimed in claim 6, wherein the cleansing step for cleansing impurities from the lithium cobalt oxide performs by utilizing 20 kHz frequencies of ultrasonic wave.

8. An apparatus for recovering lithium cobalt oxide from spent lithium batteries comprises:

a reactor main body (300), a platform (120) disposed at upper portion of the reactor main body (300), a sealing cap (320) located above the reactor main body (300) for sealing, an agitator (130) mounted under the platform (120) for mixing solutions during a reaction, an outer reaction container (200) installed inside of the reactor main body (300), an inner reaction container (100) having a smaller diameter than the outer reaction container (200) for inserting inside the outer reaction container (200), said inner reacting container (100) having a plurality of holes arranged in three rows with diameters of 0.1 mm to 1.0 mm on its upper section, a reacting container holder (230) for mutually supporting the outer reaction container (200) and the inner reaction container (100), and a separation cap (240) located at a top of the inner reaction container (100) and affixed inside the outer reaction container (200) for suspending and sealing the inner reaction containers (100) to prevent admixing reactants.

9. The apparatus as claimed in claim 8, wherein said inner reaction container (100) is designed to lower or pull-up through said reacting container holder (230) into the outer reaction container (200) for filling the reactants.

* * * * *